July 4, 1961 J. P. HAMMER 2,991,454

MATRIX SWITCHING MEANS

Filed Dec. 8, 1958 8 Sheets-Sheet 1

INVENTOR
JAMES P. HAMMER
BY
Andrew Taras
AGENT

July 4, 1961 J. P. HAMMER 2,991,454

MATRIX SWITCHING MEANS

Filed Dec. 8, 1958 8 Sheets-Sheet 3

July 4, 1961 J. P. HAMMER 2,991,454

MATRIX SWITCHING MEANS

Filed Dec. 8, 1958 8 Sheets-Sheet 4

July 4, 1961 J. P. HAMMER 2,991,454

MATRIX SWITCHING MEANS

Filed Dec. 8, 1958 8 Sheets-Sheet 5

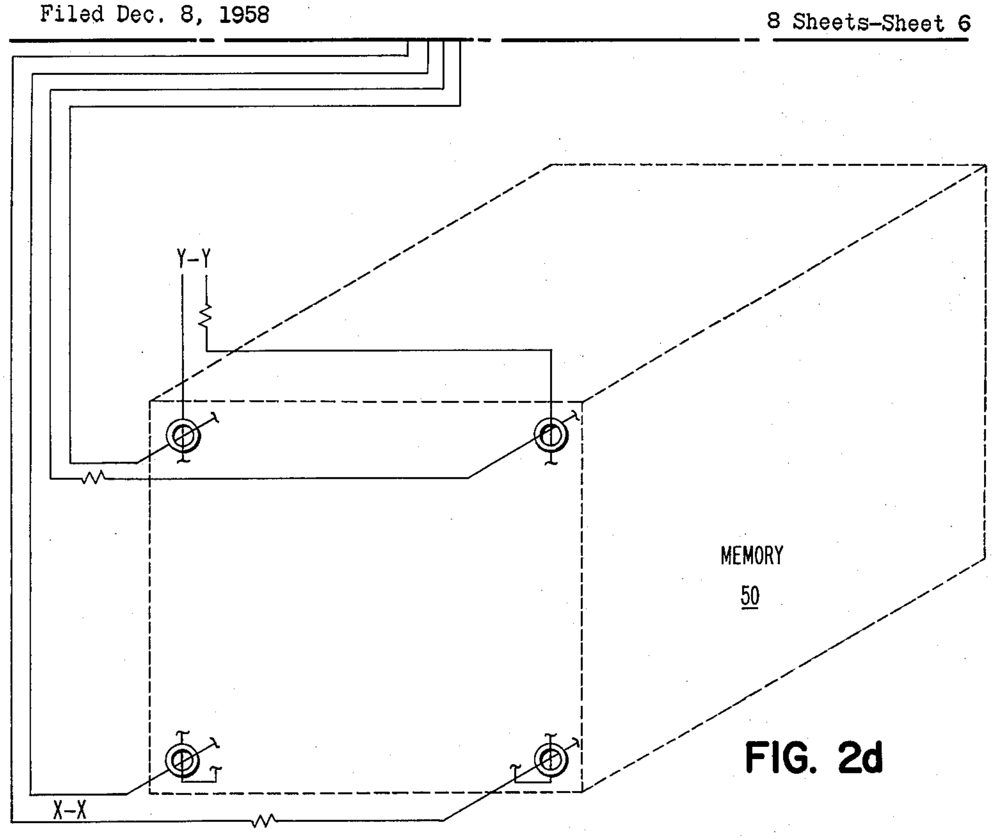

FIG. 2d

READ OUT

| | 0 | 1 | 2 | 3 | 4 | 5 | 6 | 7 | 8 | 9 | |
|---|---|---|---|---|---|---|---|---|---|---|---|
| $\overline{6}$ | 1 | 1 | 1 | 1 | 1 | 1 | 0 | 0 | 0 | 0 | W1 |
| $\overline{3}$ | 1 | 1 | 1 | 0 | 0 | 0 | 1 | 1 | 1 | 0 | W2 |
| $\overline{2}$ | 0 | 1 | 0 | 1 | 1 | 0 | 1 | 1 | 0 | 1 | W3 |
| $\overline{1}$ | 0 | 0 | 1 | 1 | 0 | 1 | 1 | 0 | 1 | 1 | W4 |
| $\overline{0}$ | 1 | 0 | 0 | 0 | 1 | 1 | 0 | 1 | 1 | 1 | W5 |
| $\overline{2 \forall 1}$ | 1 | 0 | 0 | 1 | 0 | 0 | 1 | 0 | 0 | 1 | W6 |
| $\overline{1 \forall 0}$ | 0 | 1 | 0 | 0 | 0 | 1 | 0 | 0 | 1 | 1 | W7 |
| $\overline{2 \forall 0}$ | 0 | 0 | 1 | 0 | 1 | 0 | 0 | 1 | 0 | 1 | W8 |
| $\overline{3 \forall 0}$ | 1 | 0 | 0 | 1 | 0 | 0 | 0 | 1 | 1 | 0 | W9 |
| $\overline{3 \forall 1}$ | 0 | 0 | 1 | 0 | 1 | 0 | 1 | 0 | 1 | 0 | W10 |
| $\overline{3 \forall 2}$ | 0 | 1 | 0 | 0 | 0 | 1 | 1 | 1 | 0 | 0 | W11 |
| $\overline{6 \forall 0}$ | 1 | 0 | 0 | 0 | 1 | 1 | 1 | 0 | 0 | 0 | W12 |
| $\overline{6 \forall 1}$ | 0 | 0 | 1 | 1 | 0 | 1 | 0 | 1 | 0 | 0 | W13 |
| $\overline{6 \forall 2}$ | 0 | 1 | 0 | 1 | 1 | 0 | 0 | 0 | 1 | 0 | W14 |
| $\overline{6 \forall 3}$ | 1 | 1 | 1 | 0 | 0 | 0 | 0 | 0 | 0 | 1 | W15 |
| $\overline{Q}$ | 1 | 1 | 1 | 1 | 1 | 1 | 1 | 1 | 1 | 1 | W16 |

FIG. 3

WRITE IN

| | | 0 | 1 | 2 | 3 | 4 | 5 | 6 | 7 | 8 | 9 |
|---|---|---|---|---|---|---|---|---|---|---|---|
| W1 | 6 | 0 | 0 | 0 | 0 | 0 | 0 | 1 | 1 | 1 | 1 |
| W2 | 3 | 0 | 0 | 0 | 1 | 1 | 1 | 0 | 0 | 0 | 1 |
| W3 | 2 | 1 | 0 | 1 | 0 | 0 | 1 | 0 | 0 | 1 | 0 |
| W4 | 1 | 1 | 1 | 0 | 0 | 1 | 0 | 0 | 1 | 0 | 0 |
| W5 | 0 | 0 | 1 | 1 | 1 | 0 | 0 | 1 | 0 | 0 | 0 |
| W6 | 2∀1 | 0 | 1 | 1 | 0 | 1 | 1 | 0 | 1 | 1 | 0 |
| W7 | 1∀0 | 1 | 0 | 1 | 1 | 1 | 0 | 1 | 1 | 0 | 0 |
| W8 | 2∀0 | 1 | 1 | 0 | 1 | 0 | 1 | 1 | 0 | 1 | 0 |
| W9 | 3∀0 | 0 | 1 | 1 | 0 | 1 | 1 | 1 | 0 | 0 | 1 |
| W10 | 3∀1 | 1 | 1 | 0 | 1 | 0 | 1 | 0 | 1 | 0 | 1 |
| W11 | 3∀2 | 1 | 0 | 1 | 1 | 1 | 0 | 0 | 0 | 1 | 1 |
| W12 | 6∀0 | 0 | 1 | 1 | 1 | 0 | 0 | 0 | 1 | 1 | 1 |
| W13 | 6∀1 | 1 | 1 | 0 | 0 | 1 | 0 | 1 | 0 | 1 | 1 |
| W14 | 6∀2 | 1 | 0 | 1 | 0 | 0 | 1 | 1 | 1 | 0 | 1 |
| W15 | 6∀3 | 0 | 0 | 0 | 1 | 1 | 1 | 1 | 1 | 1 | 0 |
| W16 | Q | 0 | 0 | 0 | 0 | 0 | 0 | 0 | 0 | 0 | 0 |

FIG. 4

United States Patent Office — 2,991,454 — Patented July 4, 1961

2,991,454

MATRIX SWITCHING MEANS

James P. Hammer, Endicott, N.Y., assignor to International Business Machines Corporation, New York, N.Y., a corporation of New York Filed Dec. 8, 1958, Ser. No. 778,966
9 Claims. (Cl. 340—172.5)

The invention is concerned with an improved switching scheme for a driver matrix adapted to select locations in a memory or storage unit forming a part of a computer or a data processing system.

In matrices of the prior art, the switching schemes employed therein utilized as many sets of driver components as there were sets of individual drive lines used for energizing corresponding numbers of load sharing windings inductively coupled to each row of core drivers of the matrix. Thus, for example, in a 10 x 10 matrix containing ten rows of ten core drivers per row, there would be required, according to the prior art schemes, a total of ten sets of line drivers and each set containing as many individual driver components as there are individual drive lines connecting the corresponding numbers of load sharing windings. These requirements therefore result not only in low volumetric efficiency, but also in high costs of production.

It is, therefore, the principal object of the invention to provide an improved switching scheme for a driver matrix which utilizes a minimum number of driver components to provide an economical, yet highly reliable, driver matrix.

Another object resides in a novel arrangement of driver gates and driver lines with respect to load sharing windings inductively coupled to the cores of the matrix, which enables maximum economy and efficiency to be achieved in the over-all design of the matrix.

Another object resides in the inherent advantages derived to obtain other economies in the use of a translator employing exclusive OR logic which enables 2-out-of-5 coded address signals to be accommodated by the matrix in a most efficient manner with a minimum of logical components.

Other objects of the invention will be pointed out in the following description and claims and illustrated in the accompanying drawings, which disclose, by way of examples, the principle of the invention and the best mode, which has been contemplated, of applying that principle.

In the drawings:

FIGS. 2*a*, 2*b*, 2*c* and 2*d* are arranged to form a composite electrical diagram of the invention.

FIGS. 3 and 4 are charts showing the various combinations of winding patterns used, respectively, during read-out and write-in operations.

Figure 5A:
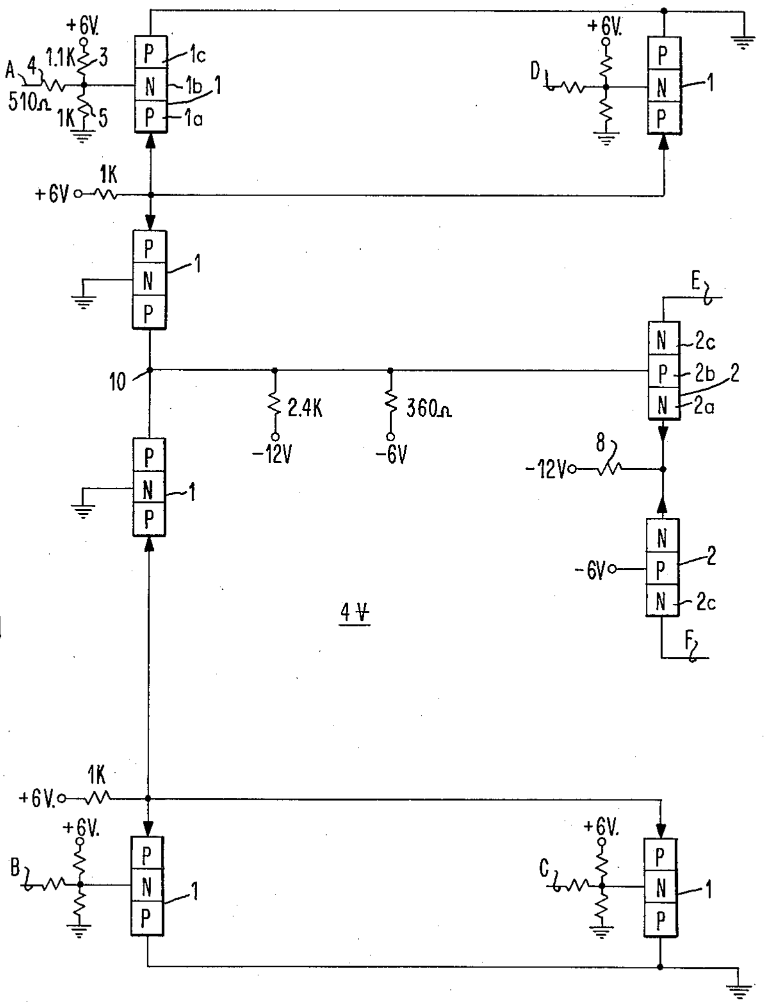
Figure 5B:
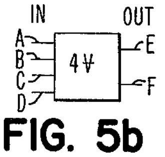

FIGS. 5*a* and 5*b* show, respectively, detailed and block circuit configurations for a logical exclusive OR device.

Figure 6:
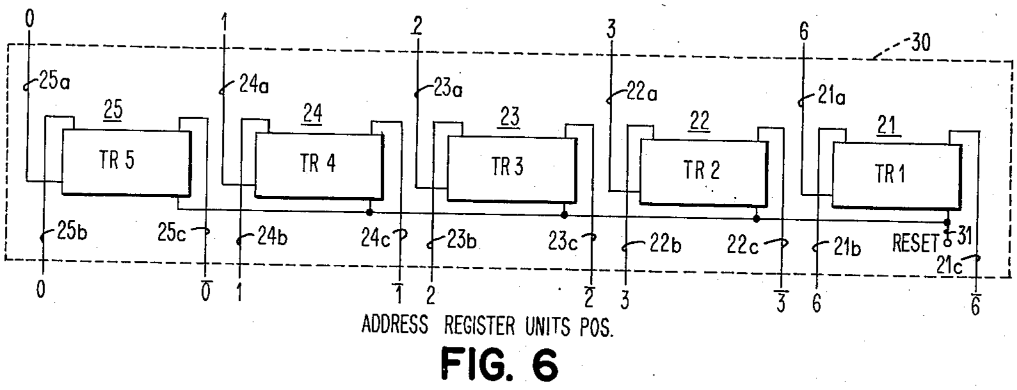

FIG. 6 shows a 5-stage address register constituting the unit's order position thereof.

Figure 7A:
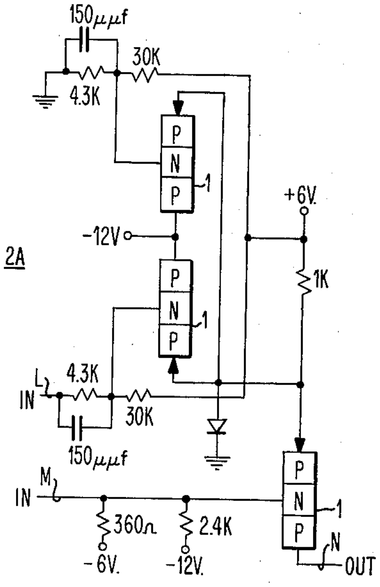
Figure 7B:
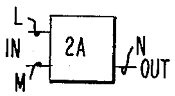

FIGS. 7*a* and 7*b* show, respectively, detailed and block circuit configurations for a 2-input logical AND device.

Figure 8B:
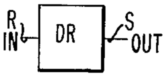
Figure 8A:
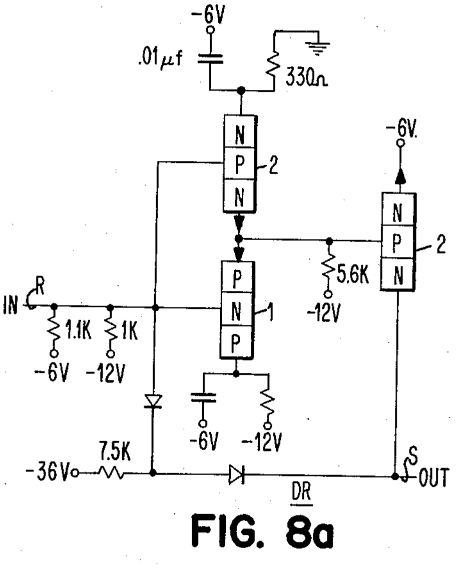

FIGS. 8*a* and 8*b* show, respectively, detailed and block circuit configurations for a driver having a single input and a single output.

Figure 9A:
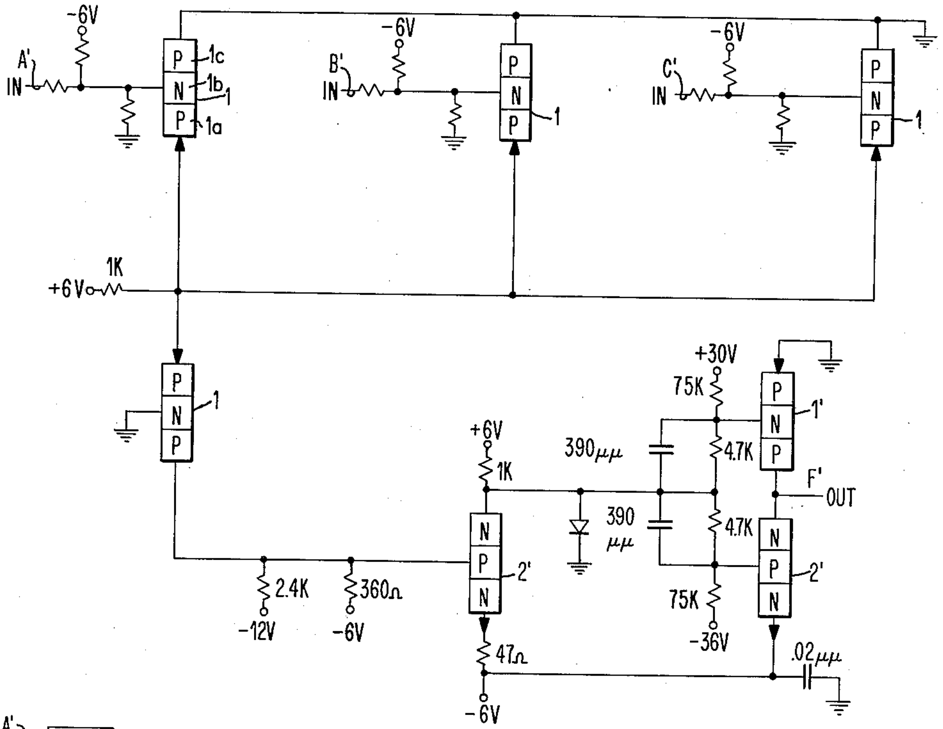
Figure 9B:
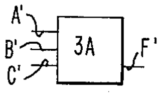

FIGS. 9*a* and 9*b* show, respectively, detailed and block circuit configurations for a 3-input AND device which further includes a current-to-voltage translating device.

Figure 10A:
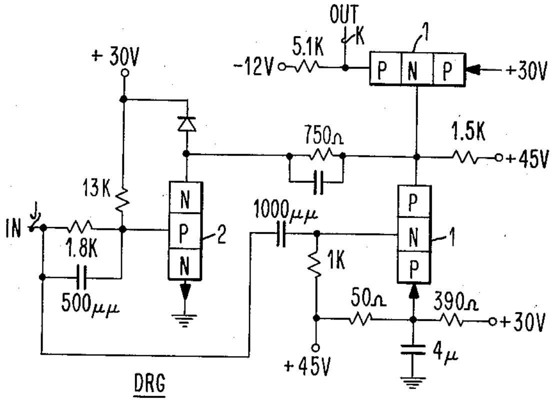
Figure 10B:
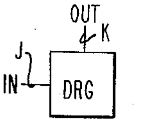

FIGS. 10*a* and 10*b* show, respectively, detailed and block circuit configurations for a driver gate device.

Figure 11:
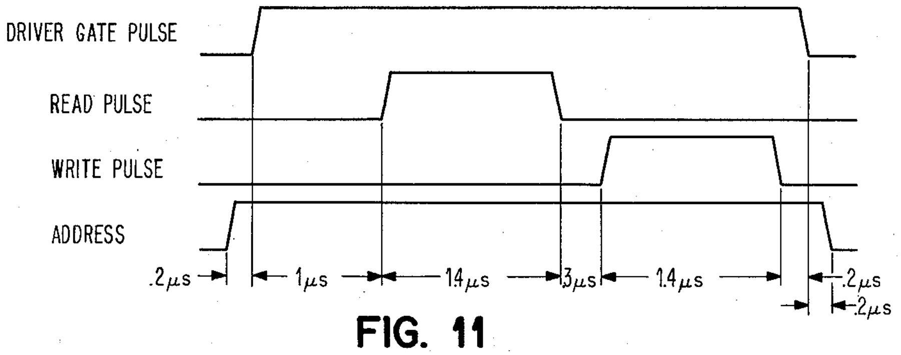

FIG. 11 is a time chart showing the pulse patterns for the principal controlling signals used in the invention.

As a preliminary to an expanation of the invention, it might be appropriate at this point to describe the electrical circuit configurations for the various components used throughout the invention. These components include exclusive OR devices, AND devices, drivers, driver gates, an address register, and core drivers.

Figure 2:
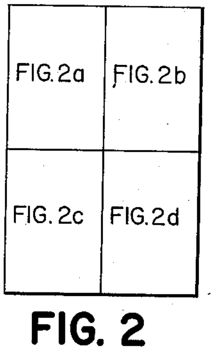
FIG. 2 shows how
Figure 2A:
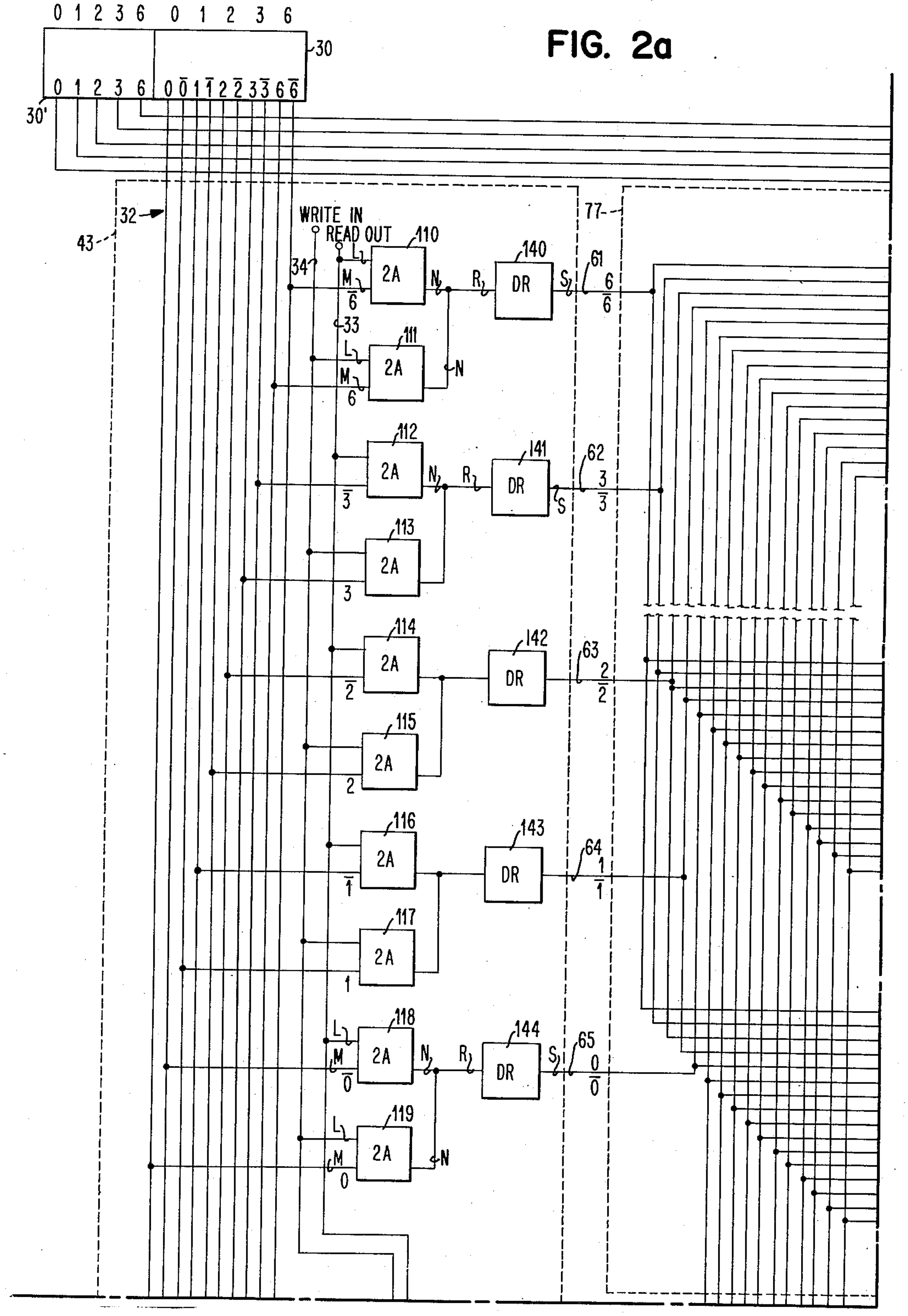
Figure 2B:
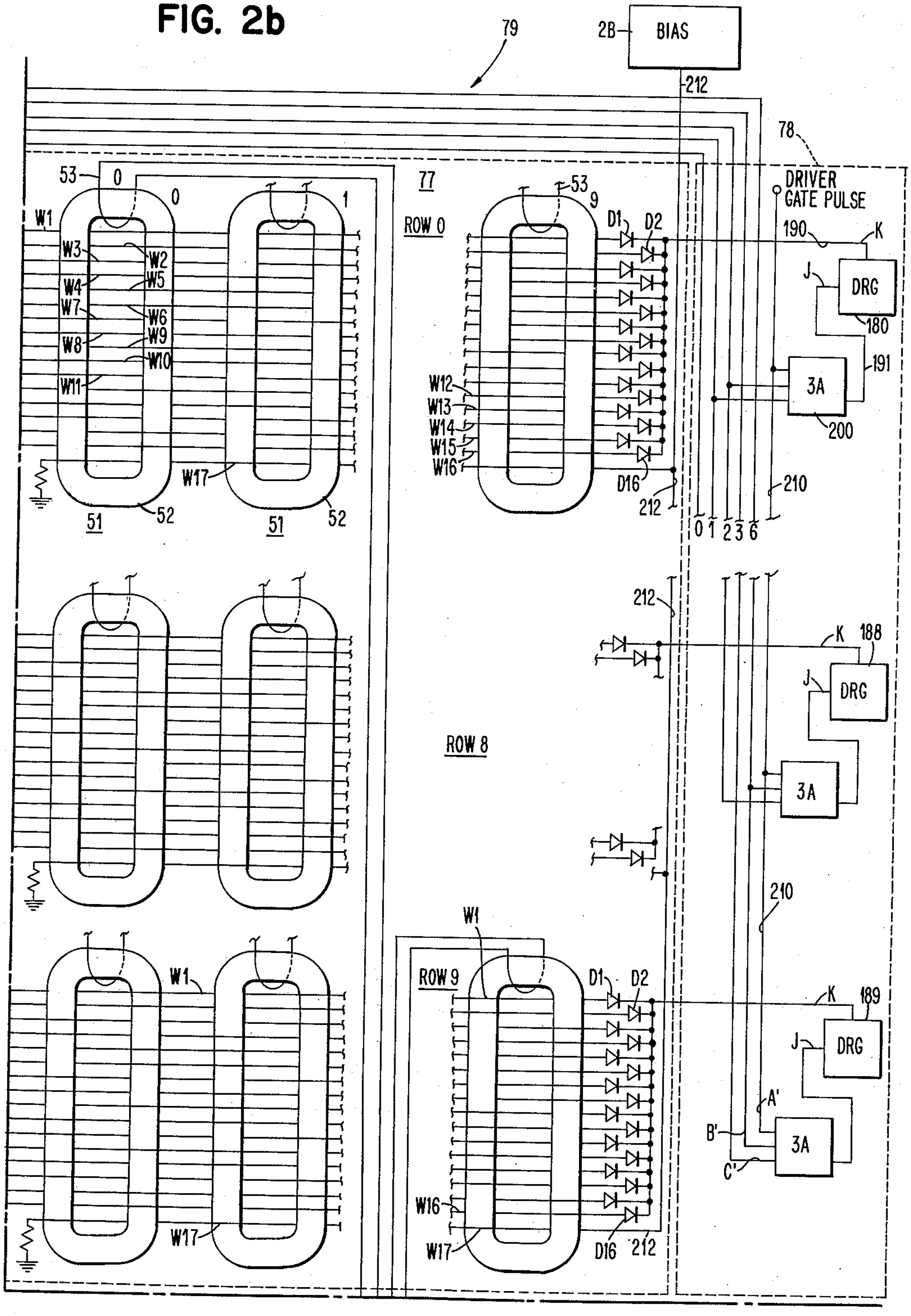
Figure 2C:
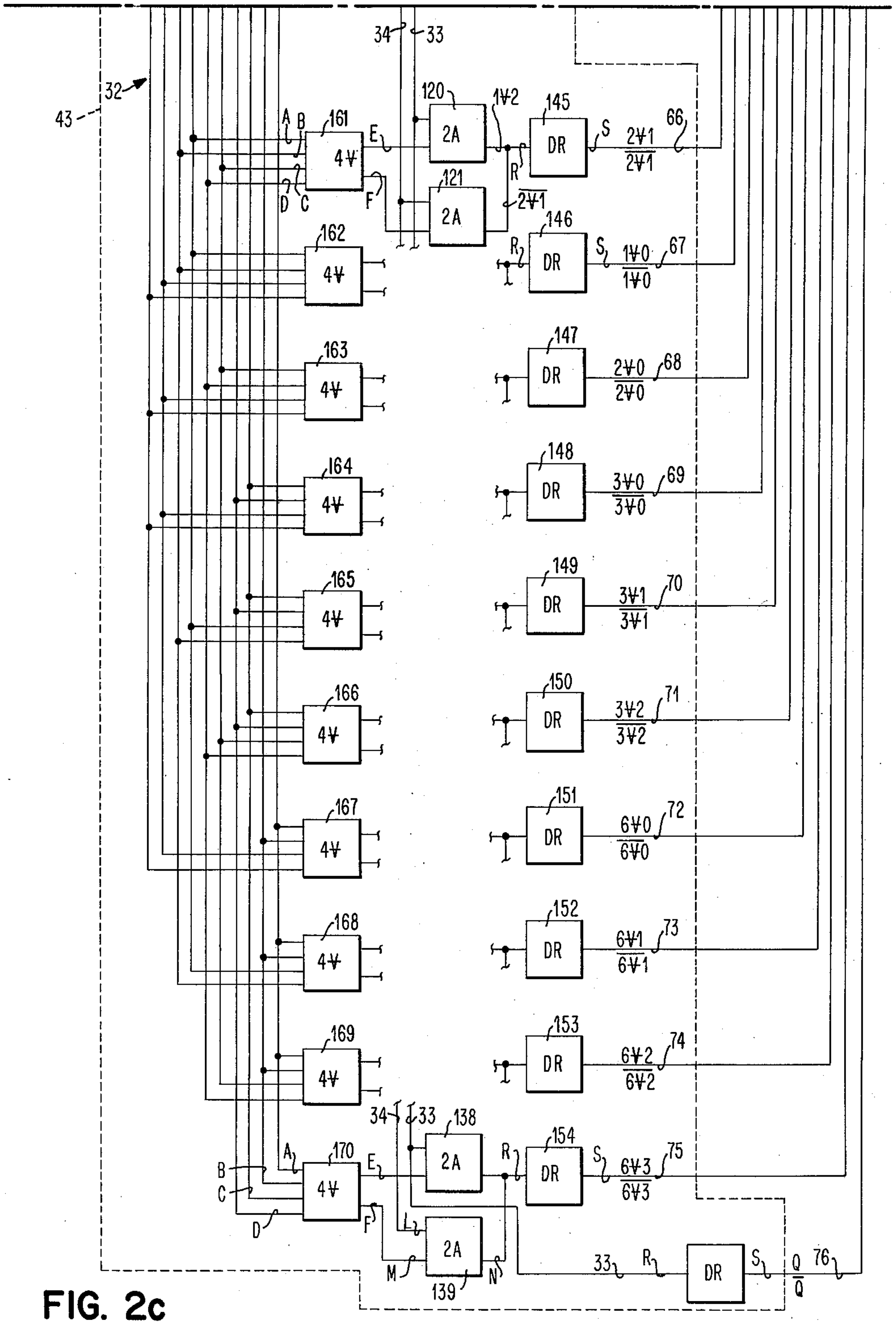

Each core driver in the 10 x 10 matrix 77 of FIG. 2*b* is generally referenced 51 and comprises a bistable core 52 having substantially square loop characteristics. Threading each core 52 are sixteen load sharing windings W1—W16, eight of which are wound in one sense while the remaining eight are wound in an opposite sense. Corresponding windings coupling each core 52, in a row of ten drivers, are serially connected so that each such winding is energized in response to a drive signal applied to a drive line connecting the series of windings. In an operating cycle comprised of a read-out half portion and a write-in half portion, a specific eight of these sixteen windings are energized during the first half cycle and the remaining eight are energized in the following or write-in half cycle. During such an operation, only one core driver in the entire 10 x 10 matrix will be upset; i.e., switched from its initial state to a second state during the first half cycle and then switched back; i.e., restored, to its initial state during the latter half cycle, the remaining core drivers not being disturbed during the operation. Ten different winding patterns for the various core drivers are shown in chart form in the charts shown in FIGS. 3 and 4. Referring to FIG. 3, for example, the top row of digits 0–9 represent ten columns, respectively, 0–9 of core drivers with ten core drivers 0–9 per column. The extreme left column of FIG. 3 shows five negated values $\overline{6}$, $\overline{3}$, $\overline{2}$, $\overline{1}$ and $\overline{0}$; ten sets of paired values expressed in negative exclusive OR logic form; and a sixteenth symbol $\overline{Q}$ representing a signal which is effective during the read-out half cycle, which signal is applied to the sixteenth winding coupled to each driver in each of the ten rows of core drivers. The 1's and 0's, in the chart of FIG. 3, merely indicate two different drive winding directions for the various windings W1—W16. There are ten different vertical patterns which show how the sixteen windings thread the ten core drivers in each of the ten rows 0–9. For each of the ten decimal values 0–9, eight drive lines of sixteen lines will be energized during the read-out half cycle; and, after which, the remaining eight lines of these sixteen drive lines will be energized during the write-in half cycle. The ten different winding patterns are coupled to the various core drivers in a manner that determines the position of the selected core driver in the matrix in accordance with address digit values standing, respectively, in the unit's and ten's positions of the address register, which values select, respectively, a column and row, the intersection of these two yielding or selecting the core driver.

In FIG. 4, the patterns are complementary to those shown in FIG. 3 and are effective during the write-in portion of a cycle. Here the ten vertical patterns of 1's and 0's are the complements of those shown in the chart of FIG. 3. The column on the extreme left of FIG. 4 shows the positive logic combinations used to energize eight of the sixteen windings during the write-in half cycle.

The exclusive OR device, shown in FIG. 5*a*, is essentially an exclusive OR switching circuit having four inputs A, B, C and D and two outputs E and F, which are effective to provide, respectively, an out-of-phase output and an in-phase output in response to a coincidence of switching signals on the A and B inputs or on the C and D inputs. This device is comprised, essentially, of PNP-type and NPN-type transistors generally referenced, respectively, 1 and 2. The PNP transistors 1 each have an emitted 1*a*, an N-type base region 1*b*, and a collector 1*c*. The NPN transistors 2 each have an emitter 2*a*, a P-type base region 2*b*, and a collector 2*c*. In the configuration shown for the transistor, the emitters are further distinguished by an arrow which points toward the emitter 1$a$, in the case of the PNP-type transistor, and away from the emitter 2$a$, in the case of the NPN-type transistor. The inputs designated A, B, C and D are each wired to a divider network which includes resistors 3, 4 and 5 connected in the manner shown to a +6 volt supply and ground. The input signals have an excursion of from approximately −1 volt to approximately +1 volt at the input to the transistor. The outputs E and F are connected respectively to associated collectors 2$c$ of their respective transistors 2 whose emitters 2$a$ are connected in common to a —12 volt supply by way of resistor 8. Point 10 in the configuration is considered to be the OR point and provides a signal in response to a coincidence of inputs on A and B, or on C and D, which signal is manifested on the output terminal F as an in-phase output signal and on output terminal E as an out-of-phase output signal.

FIG. 5$b$ shows the block configuration for the exclusive OR device, with an identifying symbol 4V̲ (meaning 4-way exclusive OR) being within the block, the inputs A, B, C and D being shown on the left side and the outputs E and F on the right side of the block. These exclusive OR devices are employed in a translator shown in the circuit drawing of FIG. 2$c$.

A 3-way AND device 3A is shown in FIG. 9$a$, which device is employed as a coincidence switching device having three inputs A′, B′, C′ and an in-phase output F′; the latter being effective in response to signals coincidentally applied on all three inputs. The AND device 3A further includes a current-to-voltage translator which provides an output in the voltage mode. The translator comprises the circuit configuration which includes, among other components, two NPN-type transistors 2′ and a single PNP-type transistor 1′. The input to the translator is fed by way of line 11. These 3-way AND devices 3A are used in the translator of FIG. 2$b$.

A 2-input AND device 2A is shown in FIG. 7$a$. This device is essentially a coincidence switching means having two inputs L and M and an output N; the latter being effective to provide an in-phase output in response to input signals coincidentally applied on the inputs L and M. The detailed circuit configuration includes three transistors of the PNP type, designated 1. The signals applied to inputs L and M, respectively, have excursions of 6 volts and 2 volts, respectively. The block configuration is shown in FIG. 7$b$ and contains the reference character 2A, which signifies a 2-way AND switch. The inputs L and M are shown on the left side of the block and the in-phase output N is shown on the right side of the block. This AND device 2A is used throughout the translator of FIGS. 2$a$ and 2$c$.

A driver gate DRG is shown in detail in FIG. 10$a$. This device functions essentially as a current switching device and includes, among other components, an NPN-type transistor 2 and two PNP-type transistors 1. The input to and the output from the device are respectively designated J and K. The input signal has an excursion from approximately −6 volts to 0 volts. The block configuration for this driver gate is shown in FIG. 10$b$ and contains the reference character DRG to signify driver gate. The input J and the output K are shown, respectively, on the left side and top side of the block. The driver gate DRG is used in selection means shown in FIG. 2$b$.

A driver DR is shown in FIG. 8$a$. This driver is essentially a current driver and includes NPN-type transistors 2 connected in the manner shown. The input to and the output from this device are shown referenced, respectively, R and S. The input R is fed from the output of the 2-way AND device 2A, as seen in FIGS. 2$a$ and 2$c$. The outputs S are connected to the various windings in the load sharing matrix by way of drive lines. A representative portion of the address register is shown in FIG. 6. This portion is designated 30 and comprises five stages numbering 21 through 25, respectively, from right to left. Each stage includes a bistable trigger, five of which are shown and referenced TR1 through TR5. Input signals representing bit values 0, 1, 2, 3 and 6 are fed, respectively, by way of trigger input lines 25$a$, 24$a$, 23$a$, 22$a$ and 21$a$. There are two output lines associated with each trigger stage. For example, for stage 21, the output lines are 21$b$ and 21$c$. When trigger 21 is turned on in response to an applied 6-bit signal, the output line 21$b$ provides a positive up level signal which represents a 6-value signal. Conversely, when the trigger is in an off state, the line 21$b$ is down while the line 21$c$ is positive, or up, and signifies the absence of a 6; this signal being designated as $\bar{6}$ (meaning a negated six). The signal output lines 21$b$, 22$b$, 23$b$, 24$b$ and 25$b$, when up, represent output values 6, 3, 2, 1 and 0, respectively. The signal output lines 21$c$, 22$c$, 23$c$, 24$c$ and 25$c$, when up, are indicative of the absence of the values 6, 3, 2, 1 and 0 and are indicated as $\bar{6}$, $\bar{3}$, $\bar{2}$, $\bar{1}$ and $\bar{0}$, respectively. In accordance with the 2-out-of-5 code system employed, specific combinations of two out of five triggers are energized to provide the decimal values 0–9, inclusive; the three remaining triggers not energized in any of these specific combinations provide the negated outputs which may be observed from the output chart as follows:

*Output chart*

| Digits | Bit Values | | | | |
|---|---|---|---|---|---|
| 0 | $\bar{6}$ | $\bar{3}$ | 2 | 1 | $\bar{0}$ |
| 1 | $\bar{6}$ | $\bar{3}$ | $\bar{2}$ | 1 | 0 |
| 2 | $\bar{6}$ | $\bar{3}$ | 2 | $\bar{1}$ | 0 |
| 3 | $\bar{6}$ | $\bar{3}$ | 2 | 1 | $\bar{0}$ |
| 4 | $\bar{6}$ | 3 | $\bar{2}$ | 1 | $\bar{0}$ |
| 5 | $\bar{6}$ | 3 | 2 | $\bar{1}$ | $\bar{0}$ |
| 6 | 6 | $\bar{3}$ | $\bar{2}$ | $\bar{1}$ | 0 |
| 7 | 6 | $\bar{3}$ | $\bar{2}$ | 1 | $\bar{0}$ |
| 8 | 6 | $\bar{3}$ | 2 | $\bar{1}$ | $\bar{0}$ |
| 9 | 6 | 3 | $\bar{2}$ | $\bar{1}$ | $\bar{0}$ |

The register 30 is used in the address register, specifically in the unit's and hundred's positions thereof, while a modified form 30′ of this register 30 is used in the ten's and thousand's positions of the address register. The modified form 30′ is similar to the 5-stage register 30 except that it is provided with five outputs rather than ten outputs. Each stage of the modified register 30′ has a single output that is up only when the associated trigger is on. A reset line 31 supplies a signal to reset each stage at an appropriate time of each matrix selection operation.

Before describing the general principle of operation, it may be desirable at this point to explain briefly the concept of the load sharing matrix.

The concept of load sharing is to combine the magnetomotive forces generated by the currents in several driving windings so that the combined magnetomotive force has a value equal to that generated by the current which would otherwise be applied to a single driving winding. Consequently, each driving circuit need only furnish a fraction of the current required to change the state of the magnetic core. This reduction in current and power required from each driving circuit is especially advantageous where the current-carrying capacity of the current drivers must be kept small. Thus, in the present case, the unit of current provided by each driver generates a unit magnetomotive force $H_U$ which is equal to $$H_T \Big/ \frac{N}{2}$$

where $H_T$ is the total magnetomotive force required to drive the core and N is the total number of driving windings. In applying the principle of load sharing, N windings are inductively coupled to a core with one half of the windings passing through the core in the "1" sense and the other half of the windings passing through the core in the "0" sense. Consequently, $N/2$ windings pass through the core in the "1" sense and $N/2$ windings pass through the core in the "0" sense. Hence, during read time of a memory cycle, by applying drive current pulses coincidently to the $N/2$ windings in the "1" sense, $N/2$ units of magnetomotive force are combined to drive a core, which is in the 0 state, to the 1 state. The change in flux, when the core switches from the 0 state to the 1 state, induces an output pulse in the output winding of the core which may be used as a read drive pulse for a selected column or row winding of memory. Likewise, during write time of a memory cycle, by applying drive current pulses coincidently to the $N/2$ windings in the "0" sense, $N/2$ units of magnetomotive force are combined to drive the core, which is in the 1 state, to the 0 state. The change in flux, when the core switches from the 1 state to the 0 state, induces an output pulse in the output winding of the core equal in magnitude, but opposite in sense, to that of the first-mentioned output pulse which may be used as a write drive pulse for the selected column or row winding of memory.

Figure 1:
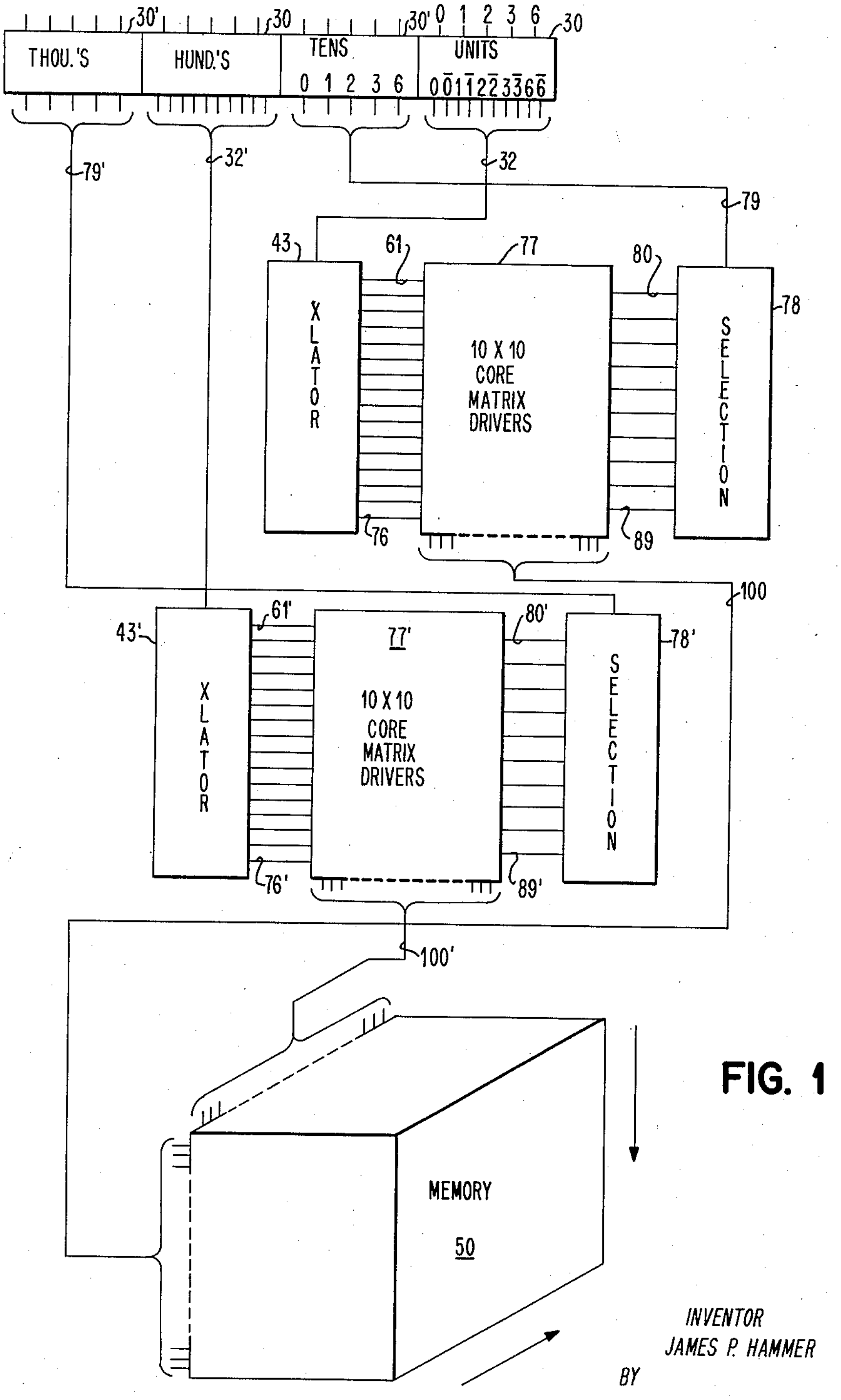
FIG. 1 is a schematic diagram of the invention illustrating the general principle of operation.

The general principle of operation may be briefly explained in connection with FIG. 1 which shows a 4-position address register comprised of a unit's order 30, ten's order 30′, a hundred's order 30 and a thousand's order 30′. Address data is supplied by way of four data channels to the respective orders of the address register. These data channels have five lines each through which are transmitted 2-out-of-5 coded data constituted of bit values 0, 1, 2, 3 and 6. The unit's and hundred's orders have each ten outputs, and the ten's and thousand's orders have each five outputs. The ten output lines from the unit's register 30 are shown generally as a single output channel generally referenced 32. The latter channel is fed to the translator 43 which contains the exclusive OR components 4V, AND devices 2A, drivers DR, and control signals for the read-out and write-in operations. These components are connected, in a manner to be described in greater detail later on, to sixteen output lines 61–76. Eight of these lines provide outputs based on the negative logic, shown in FIG. 3, during the read-out half cycle; and the remaining eight lines provide outputs based on the positive logic, shown in FIG. 4, during the write-in half cycle. These sixteen output lines 61–76 are connected to the 10 x 10 matrix 77 which has 100 output lines represented by a single channel line generally referenced 100. The selection of a core driver within the 10 x 10 matrix 77 is further conditioned by an appropriate one of ten driver gates in a selection means 78, which, in turn, is controlled by coded data values issued from the ten's order position of the address register by way of a channel, generally referenced 79, containing five bit lines for conveying the bit values 0, 1, 2, 3 and 6. The combination of the coded data signals in conjunction with gate signals issued along ten individual lines 80–89, extending between the matrix 77 and the selection means 78, causes a particular one of the ten driver gates, within the selection means 78, to be operative to cause the selection of a particular core driver in the matrix 77. The output from the selected core driver is then fed along an appropriate one of the 100 output lines in the channel 100. This output is then fed to an appropriate X—X plane of core memory windings, which output is one of two outputs conjointly used, to select a word location in the memory 50. Referring to the address register, it may be seen that the hundred's and thousand's order positions thereof cooperate in the same manner as do the unit's and ten's order positions, respectively, to select a driver core in a matrix 77′. The hundred's order position provides ten outputs similar to the ten outputs of the unit's order position. The former outputs are issued along ten output lines contained in a channel generally designated 32′. The latter, in turn, is connected to a translator 43′ similar in every respect to the translator 43. The translator 43′ is provided with sixteen output drive lines 61′–76′ in turn connected to the 10 x 10 matrix 77′ which is similar to the matrix 77. The matrix 77′ has ten output lines 80′–89′ connected to selection means 78′. The latter is controlled by a channel 79′ containing five bit lines connected to the thousand's order position of the address register. Thus, the combination of digit values, coded in 2-out-of-5 code form, in the hundred's and thousand's positions of the address register cause the selection of a specific core driver in the 10 x 10 matrix 77′. The output of this selected core driver passes along the channel 100′ to a Y—Y plane of memory core windings, the latter output being issued at the same time that the driver output, issued from the matrix 77, passes through channel 100. These two output driver signals are issued concurrently to the respective X—X plane of memory windings and the Y—Y plane of memory core windings in the memory 50, and the intersection of these two planes yields the word location specified by the 4-digit address in the address register.

The invention may now be described in greater detail in connection with FIGS. 2*a*, 2*b*, 2*c* and 2*d* and the time chart of FIG. 11. Referring to FIG. 2*a*, it may be noted that the portion of the translator 43, shown in FIG. 2*a*, includes the 2-input AND devices numbering 110—119. The even-numbered devices 110—118 have each an input L connected to a single one of the negated lines $\bar{6}$, $\bar{3}$, $\bar{2}$, $\bar{1}$ and $\bar{0}$ contained in the channel 32. The second input M of each of these even-numbered AND devices is connected to a common read-out line 33, which supplies a read-out pulse according to the time indicated in the chart of FIG. 11. The odd-numbered AND devices 111—119 have each an input L connected to a single one of the postive lines 6, 3, 2, 1 and 0 contained in the channel 32. The second input M of each of these AND devices is connected to a common write-in line 34, which supplies a write-in pulse according to the time indicated in the chart of FIG. 11. The outputs of these AND devices 110—119 are connected in pairs, as shown, to an appropriate one of the drivers DR numbering 140—144; the paired connections forming a logical OR combination. The outputs from the drivers 140—144 are applied to the output drive lines 61—65, in turn connected, respectively, to the windings W1—W5 of the core drivers in the matrix 77. The code patterns issued along these output drive lines 61—65 depend upon the address values set up in the unit's position of the address register. The patterns are issued first under control of the even-numbered AND devices 110—118 during the read-out half cycle, which pulse patterns are in negated form, as may be appreciated from FIG. 3. The output patterns issued during the write-in half cycle are under control of the odd-numbered AND devices 111—119; and these pulses are of a positive form, as may be appreciated from the chart of FIG. 4. The translator 43 also includes the circuit configuration shown in FIG. 2*c*, which configuration comprises ten exclusive OR devices numbering 161—170. Each of these devices 4V have four inputs A, B, C and D connected, in the manner shown, to the various positive and negative bit lines; namely, $\bar{6}$, 6, $\bar{3}$, 3, $\bar{2}$, 2, $\bar{1}$, 1, $\bar{0}$ and 0 of the channel 32. The E and F outputs for each of these devices 4V are fed into the AND device 2A numbering 120—139, arranged in pairs to form OR devices. The OR'd outputs are fed into an appropriate one of the drivers numbering 145—154. Outputs from the latter are then fed into the output drive lines 66—75. Each line provides a negated output during the read-out half cycle and a positive output during the write-in half cycle. The outputs on the lines 66—75 are based on the coincidence of two of the five bit values as indicated in column 1, rows 6–15, in each of the charts of FIGS. 3 and 4. The output lines 66—75 are connected to driver core windings W6—W15, shown in FIG. 2*b*.

To illustrate what driver output lines are effected for any digit value 0–9 standing in the address register unit's order, during read-out and write-in operations, it is only necessary to refer to the appropriate digit value in the top row of the charts in FIGS. 3 and 4. For example, assume the value 5 to be in the address register; this same value is then located in the top row of the values 0–9, in FIG. 3; and, in the vertical column thereunder, the eight 1's indicate which eight of the various windings W1—W16 are energized during the read-out cycle. During the write-in cycle, the remaining eight windings will be energized according to the 1's found in column 5 in the chart of FIG. 4.

One of the unique features of the invention concerns the switching arrangement employed in the matrix scheme. The switching arrangement is shown in part only in FIG. 2*b* in the selection means 78. The latter includes driver gates DRG for selectively switching a row out of the ten rows of core drivers in the matrix 77. Ten driver gates DRG are employed in this switching means 78, however, only three are shown; namely, a driver gate 180 for row 0, a driver gate 188 for row 8 and a driver gate 189 for row 9. The output K of each driver gate DRG, for example, driver gate 180, is connected to a matrix output line which is connected to the cathodes of sixteen diodes D1—D16, the plates of which are connected each to the windings W1—W16. The output J to the same driver 180 is connected to a line 191 in turn connected to the output of AND device 3A, referenced 200. Two inputs to the latter device 200 are connected to the 0-bit and 1-bit lines contained in the channel 79. The third input to this AND device 200 is connected to a line 210 over which a driver gate pulse is transmitted during the time indicated in FIG. 11. The driver gates 180—189 are gated, respectively, under control of a different one of the digit values 0–9, respectively, appearing in the ten's order position of the address register. Thus, an address value in the unit's and ten's order positions of the address register causes the selection, respectively, of the corresponding numbered matrix column and matrix row in the matrix 77, the intersection of the selected column and row yielding the selected core driver. This operation takes place during the read-out cycle to cause the selected core to be switching from an original stable state to an opposite stable state. On the write-in cycle, the selected core is caused to be switched from its switched state back to its original state. Because of the variations existing in the various cores, it may be necessary to provide a bias winding to each one of the drive cores in the matrix. Such a winding is indicated as winding W17 and is connected to a bias line 212 in turn connected to an appropriate power supply 213, which delivers a current whose magnitude is approximately one-fifth that of the current delivered by a driver DR.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a switching arrangement for a core driver matrix of the type in which each core driver has two conditions of stability and each driver is selected upon energization of a pattern of load sharing windings unique to the driver and in which the different patterns in each row, of a plurality of rows, are interconnected to a plurality of matrix input and output lines, the combination comprising: means for supplying row and pattern designating signals; a plurality of row output gates, each gate adapted to gate all matrix output lines in a designated row in response to the reception of an appropriate row designating signal; a translator connected to the matrix input lines and operable in response to the reception of a pattern designating signal for conditionally selecting for energization an appropriate pattern in the designated gated row; and translator switching means having two switching operations, the first switching operation energizing half of the windings in the conditioned pattern to cause the associated core driver to assume a second condition of stability, the second switching operation energizing the remaining windings in the conditioned pattern to cause the associated core driver to assume a first condition of stability.

2. In a switching arrangement for a core driver matrix of the type in which each core driver has two conditions of stability, each core driver having an output sense winding, selection of a core driver being effected upon energization of a pattern of load sharing windings unique to the core driver, the different patterns in each row, of a plurality of rows, being interconnected to a plurality of matrix input and output lines, the combination comprising: means for supplying row and pattern designating signals; a plurality of row output gates, each gate adapted to gate all matrix output lines in a designated row in response to the reception of an appropriate row designating signal; a translator connected to the matrix input lines and operable in response to the reception of a pattern designating signal for conditionally selecting for energization an appropriate pattern in the designated gated row; and translator switching means having two switching operations, the first switching operation energizing half of the windings in the conditioned pattern to cause the associated core driver to assume a second condition of stability, the second switching operation energizing the remaining windings in the conditioned pattern to cause the associated core driver to assume a first condition of stability, and the associated sense output winding issuing an appropriate driver output signal in each such operation.

3. In a switching arrangement for a core driver matrix of the type in which each core driver has two conditions of stability, each core driver having an output sense winding, selection of a core driver being effected upon energization of a pattern of load sharing windings unique to the core driver, the different patterns in each row, of a plurality of rows, being interconnected to a plurality of matrix input and output lines, the combination comprising: means for supplying row designating signals, and paired designating signals for each pattern, each pair comprising a positive signal and a corresponding negated signal; a plurality of row output gates, each gate adapted to gate all matrix output lines in a designated row in response to the reception of an appropriate row designating signal; a translator connected to the matrix input lines and operable in response to the reception of a pattern designating signal for conditionally selecting for energization an appropriate pattern in the designated gated row; and a translator switching means having two switching operations, the first switching operation energizing half of the windings in the conditioned pattern in response to the reception of negated pattern signals to cause the associated core driver to assume a second condition of stability, the second switching operation energizing the remaining windings in the conditioned pattern in response to the reception of positive pattern signals to cause the associated core driver to assume a first condition of stability, and the associated sense output winding issuing an appropriate driver output signal in each such operation.

4. In a switching arrangement for a driver matrix of the type in which each driver has two conditions of stability, each driver having an output means, selection of a driver being effected upon energization of a pattern of load sharing circuits unique to the driver, the different patterns in each row, of a plurality of rows, being interconnected to a plurality of matrix input and output lines, the combination comprising: means for supplying row and pattern designating signals; a plurality of row output gates, each gate adapted to gate all matrix output lines in a designated row in response to the reception of an appropriate row designating signal; a translator connected to the matrix input lines and operable in response to the reception of a pattern designating signal for conditionally selecting for energization an appropriate pattern in the designated gated row; and a translator switching means having two switching operations, the first switching operation energizing half of the load sharing circuits in the conditioned pattern to cause the associated driver to assume a second condition of stability, the second switching operation energizing the remaining load sharing circuits in the conditioned pattern to cause the associated driver to assume a first condition of stability, and the associated output means issuing an appropriate driver output signal in each such operation.

5. In a switching arrangement for a driver matrix of the type in which each driver has two conditions of stability, each driver having an output means, selection of a driver being effected upon energization of a pattern of load sharing circuit means unique to the driver, the different patterns in each row, of a plurality of rows, being interconnected to a plurality of matrix input and output lines, the combination comprising: means for supplying rows designating signals, and paired designating signals for each pattern, each pair comprising a positive signal and a corresponding negated signal; a plurality of transistorized row output gates, each gate adapted to gate all matrix output lines in a designated row in response to the reception of an appropriate row designating signal; a translator connected to the matrix input lines and operable in response to the reception of a pattern designating signal for conditionally selecting for energization an appropriate pattern in the designated gated row; and a translator switching means having two switching operations, the first switching operation energizing half of the load sharing circuit means in the conditioned pattern in response to the reception of negated pattern signals to cause the associated driver to assume a second condition of stability, the second switching operation energizing the remaining load sharing circuit means in the conditioned pattern in response to the reception of positive pattern signals to cause the associated driver to assume a first condition of stability, and the associated output means issuing an appropriate driver output signal in each such operation.

6. In a switching arrangement for a core driver matrix of the type in which each core driver has two conditions of stability, each core driver having an output sense winding, selection of a core driver being effected upon energization of a pattern of load sharing windings unique to the core driver, the different patterns in each row, of a plurality of rows, being interconnected to a plurality of matrix input and output lines, the combination comprising: means for supplying coded row designating signals, and coded paired designating signals for each pattern, each pair comprising a combination of coded signals in positive form and a complementary combination in negated form; a plurality of transistorized row output gates, each gate adapted to gate all matrix output lines in a designated row in response to the reception of an appropriately coded row designating signal; a translator connected to the matrix input lines and operable in response to the reception of a pattern designating signal for conditionally selecting for energization an appropriate pattern in the designated gated row; and a translator switching means having two switching operations, the first switching operation energizing half of the windings in the conditioned pattern in response to the reception of a complementary combination of negated signals to cause the associated core driver to assume a second condition of stability, the second switching operation energizing the remaining windings in the conditioned pattern in response to the reception of a combination of coded signals in positive form to cause the associated core driver to assume a first condition of stability, and the associated sense output winding issuing an appropriate driver output signal in each such operation.

7. In a switching arrangement for a core driver matrix of the type in which each core driver has two conditions of stability, each core driver having an output sense winding, selection of a core driver being effected upon energization of a pattern of sixteen load sharing windings unique to the core driver, the different patterns in each row, of a plurality of rows, being interconnected to a plurality of matrix input and output lines, the combination comprising: a 2-position register for receiving 2-out-of-5 coded representations, each representing a different one of ten decimal values 0–9, one register position adapted, in response to the reception of a coded representation, to provide output combinations in the same code form to designate a particular matrix row, the other register position adapted, in response to the reception of a coded representation, to provide output combinations, based on a 5-out-of-10 code, containing positive and negative signals; individual row output gates, one for each row and each adapted to gate all the matrix outputs within an associated row in response to the reception of coded signals appropriate to a designated row; a translator responsive to the 5-out-of-10 coded combinations to provide two successive output combinations in accordance with 8-out-of-16 code form, the first such combination providing eight signals in negated form and the second providing eight signals in positive form; means connecting the sixteen translator outputs respectively to the sixteen winding inputs in each of all the rows, said translator operable in response to the reception of a coded combination to condition for energization a row pattern appropriate to said coded combination; and translator switching means adapted to energize eight of the windings of the conditioned pattern to cause the associated driver to assume a second condition of stability in response to eight negated signals, and thereafter to energize the remaining eight windings in response to eight positive signals to cause said driver to assume a first condition of stability.

8. In a switching arrangement for a core driver matrix of the type in which each core driver has two conditions of stability, each core driver having an output sense winding, selection of a core driver being effected upon energization of a pattern of $n$ load sharing windings unique to the core driver, the different patterns in each row, of a plurality of rows, being interconnected to a plurality of matrix input and output lines, the combination comprising: a 2-position register for receiving 2-out-of-5 coded representations, each representing a different one of ten decimal values 0–9, one register position adapted, in response to the reception of a coded representation, to provide output combinations in the same code form to designate a particular matrix row, the other register position adapted, in response to the reception of a coded representation, to provide output combinations, based on a 5-out-of-10 code, containing positive and negative signals; individual row output gates, one for each row and each adapted to gate all the matrix outputs within an associated row in response to the reception of coded signals appropriate to a designated row; a translator responsive to the 5-out-of-10 coded combinations to provide two successive output combinations in accordance with an 8-out-of-16 code form, the first such combination providing $n/2$ signals in negated form and the second providing $n/2$ signals in positive form; means connecting the translator outputs respectively to the $n$ winding inputs in each of all the rows, said translator operable in response to the reception of a coded combination to condition for energization a row pattern appropriate to said coded combination; and translator switching means adapted to energize $n/2$ windings of the conditioned pattern to cause the associated driver to assume a second condition of stability in response to $n/2$ negated signals, and thereafter to energize the remaining windings in response to $n/2$ positive signals to cause said driver to assume a first condition of stability.

9. A switching arrangement for a driver matrix of the type in which the drivers are arranged in rows, each driver being settable to one or the other of two stable states and the switching of any one of the drivers being determined by an appropriate combination of row and pattern designating signals, comprising: interconnected load sharing windings threading all the drivers in each row of said rows, the windings for each driver being uniquely oriented to provide for the selective switching of said drivers, each interconnected load sharing winding of each row having an individual input and a common output; an input translator connected to all the individual inputs and responsive to said pattern designating signals to select a pattern of said interconnected load sharing windings according to the value of the designation; and a plurality of row output gates, one connected to each common output, each gate being responsive to a particular row designating signal for energizing the selected pattern of load sharing windings in a designated row whereby a designated driver is switched.

References Cited in the file of this patent

UNITED STATES PATENTS

| | | |
|---|---|---|
| 2,719,962 | Karnaugh | Oct. 4, 1955 |
| 2,768,367 | Rajchman | Oct. 23, 1956 |
| 2,846,671 | Yetter | Aug. 5, 1958 |
| 2,920,315 | Markowitz et al. | Jan. 5, 1960 |
| 2,929,050 | Russell | Mar. 15, 1960 |